(No Model.)

S. R. EDNEY.
WAGON AXLE.

No. 290,760. Patented Dec. 25, 1883.

WITNESSES:
Fred. G. Dieterich
Charles D. Baker

INVENTOR.
Samuel R. Edney
by
N. W. Fitzgerald ATTORNEY.

United States Patent Office.

SAMUEL R. EDNEY, OF SOUTH MILLS, NORTH CAROLINA.

WAGON-AXLE.

SPECIFICATION forming part of Letters Patent No. 290,760, dated December 25, 1883.

Application filed July 11, 1882. Renewed October 25, 1883. (No model.)

*To all whom it may concern:*

Be it known that I, SAMUEL R. EDNEY, a citizen of the United States, residing at South Mills, in the county of Camden and State of North Carolina, have invented certain new and useful Improvements in Wagon and Cart Axles; and I do hereby declare the following to be a full, clear, and exact description of the invention, such as will enable others skilled in the art to which it appertains to make and use the same.

My invention relates to certain new and useful improvements in axles for vehicles, in which double and independent spindles or axles are connected to each end of axle-tree, whereby they may be reversed from end to end, as the wear of them may require; and to this end the invention consists in novel features of construction, and combination and arrangement of parts, all as will be hereinafter fully described, and set forth in the claims hereto annexed.

Figure 1:
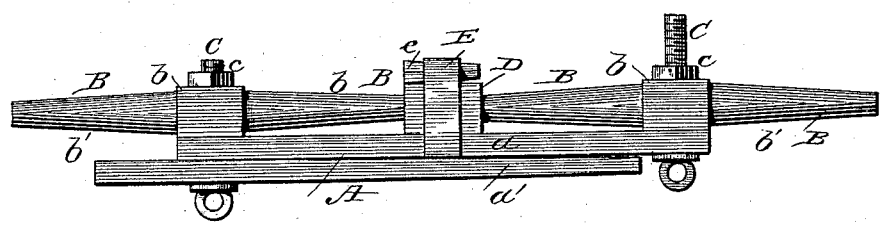
Figure 2:
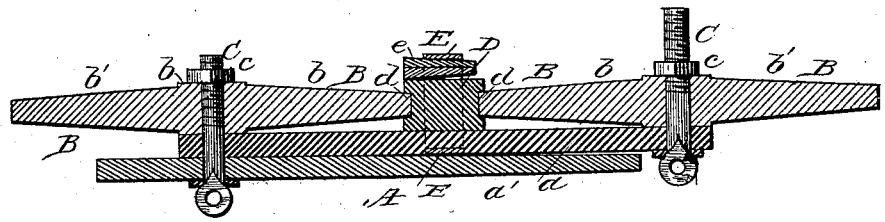

Referring to the accompanying drawings. Figure 1 is a front elevation. Fig. 2 is a vertical and longitudinal section through the middle of the axles.

In the drawings, A represents the axle-tree formed of the two parts $a\ a'$, and B B double and independent spindles or axles, connected to the axle-tree by screw-bolts and nuts C $c$, passing through the axle-tree and the shoulders $b$ of the double spindles or axles. The arms $b'\ b'$ of the spindles or axles B B are made tapering, and the inner ones adapted to fit in recesses $d\ d$ in the sides of the bolster or top piece, D, which is connected to the axle-tree by a metallic clip, E, adjustably secured thereto by one or more wedges, $e$. It will be observed that the double and independent spindles or axles connected by bolster or top piece, D, form a complete single axle, which, in connection with the double axle-tree A $a$ $a'$ forms a very strong axle, the portion $a'$ holding the clip in place in case of the wedges coming out; and, further, the spindles or axles can be reversed end for end, and moved, also, up and down, as may be deemed expedient, in case of wear; and by being made as shown, they can be turned in a common lathe, and also cheapened in construction, as they can be made of short timbers.

The above-described construction of axles can be applied to all farm or road vehicles, and formed of iron or wood, or both combined.

Having thus fully described my invention, what I claim as new, and desire to secure by Letters Patent, is—

1. The combination, with an axle-tree, of the double and independent reversible spindles or axles B B, connected together by recessed bolster D, and to the ends of the axle-tree, substantially in the manner as and for the purpose herein shown and described.

2. The combination, with an axle-tree, of the double and reversible spindles or axles B B, connected to the ends thereof, the recessed bolster for connecting said axles or spindles, and the clip and one or more wedges for securing bolster to axle-tree, substantially as and for the purpose herein shown and described.

3. The combination of the axle-tree formed of the two parts $a\ a'$, double and reversible axles or spindles connected to the ends of said axle-tree, recessed bolster for connecting said axles or spindles, and the clip and wedge or wedges for securing bolster to axle-tree, substantially as and for the purpose herein shown and described.

In testimony whereof I affix my signature in presence of two witnesses.

SAMUEL R. EDNEY.

Witnesses:
 C. H. SPENCER,
 P. G. MOINSETH.